US011234184B1

(12) United States Patent
Lee et al.

(10) Patent No.: US 11,234,184 B1
(45) Date of Patent: Jan. 25, 2022

(54) METHOD FOR PROVIDING SYSTEM INFORMATION TO REMOTE UE IN WIRELESS COMMUNICATION SYSTEM AND APPARATUS THEREFOR

(71) Applicant: LG ELECTRONICS INC., Seoul (KR)

(72) Inventors: Jaewook Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 745 days.

(21) Appl. No.: 16/081,016

(22) PCT Filed: Mar. 8, 2017

(86) PCT No.: PCT/KR2017/002478
§ 371 (c)(1),
(2) Date: Aug. 29, 2018

(87) PCT Pub. No.: WO2017/155291
PCT Pub. Date: Sep. 14, 2017

Related U.S. Application Data

(60) Provisional application No. 62/305,492, filed on Mar. 8, 2016, provisional application No. 62/320,600, filed on Apr. 10, 2016.

(51) Int. Cl.
*H04W 4/00* (2018.01)
*H04W 48/10* (2009.01)
(Continued)

(52) U.S. Cl.
CPC ........... *H04W 48/10* (2013.01); *H04W 48/12* (2013.01); *H04W 72/005* (2013.01); *H04W 88/04* (2013.01)

(58) Field of Classification Search
CPC ... H04W 48/10; H04W 48/12; H04W 72/005; H04W 88/04
(Continued)

(56) References Cited

U.S. PATENT DOCUMENTS

| 8,000,713 B2 | 8/2011 | Farnsworth et al. |
| 2013/0250773 A1* | 9/2013 | Ohta .................... H04W 76/20 370/241 |

(Continued)

FOREIGN PATENT DOCUMENTS

| KR | 1020150072809 | 6/2015 |
| KR | 1020160003257 | 1/2016 |
| WO | 2015115861 | 8/2015 |

OTHER PUBLICATIONS

PCT International Application No. PCT/KR2017/002478, Written Opinion of the International Searching Authority dated Jun. 16, 2017, 8 pages.
(Continued)

*Primary Examiner* — Chuong T Ho
(74) *Attorney, Agent, or Firm* — Lee Hong Degerman Kang Waimey

(57) ABSTRACT

A method for receiving broadcast information by a user equipment (UE) connected with a network via a relay UE in a wireless communication system is disclosed. The method includes steps of determining whether the broadcast information stored in the UE is updated or not; transmitting a request message for updating the broadcast information to the relay UE, when the broadcast information stored in the UE is not updated; and receiving the requested broadcast in¬formation from the relay UE or the network.

4 Claims, 6 Drawing Sheets

(51) Int. Cl.
*H04W 72/00* (2009.01)
*H04W 88/04* (2009.01)
*H04W 48/12* (2009.01)

(58) Field of Classification Search
USPC ................................. 370/329, 330
See application file for complete search history.

(56) References Cited

U.S. PATENT DOCUMENTS

| | | | |
|---|---|---|---|
| 2014/0162545 A1* | 6/2014 | Edge | H04W 28/06 455/3.01 |
| 2016/0056926 A1* | 2/2016 | Li | H04L 5/14 370/280 |
| 2016/0218821 A1* | 7/2016 | Adhikary | H04W 56/0055 |
| 2018/0146404 A1* | 5/2018 | Zhang | H04W 48/12 |
| 2018/0192433 A1* | 7/2018 | Ouyang | H04W 72/1242 |
| 2018/0234917 A1* | 8/2018 | Kim | H04W 52/0216 |
| 2018/0270866 A1* | 9/2018 | Loehr | H04L 1/188 |
| 2019/0182802 A1* | 6/2019 | Yu | H04L 1/0009 |
| 2019/0320311 A1* | 10/2019 | Wang | H04W 4/12 |
| 2019/0320443 A1* | 10/2019 | Wang | H04W 88/04 |
| 2021/0176698 A1* | 6/2021 | Tang | H04W 48/12 |

OTHER PUBLICATIONS

ZTE, "Resource scheme for UE-to-network Relay UE and remote UE", 3GPP TSG RAN WG1 Meeting #81, R1-152967, May 2015, 7 pages.

* cited by examiner

[Fig. 1]
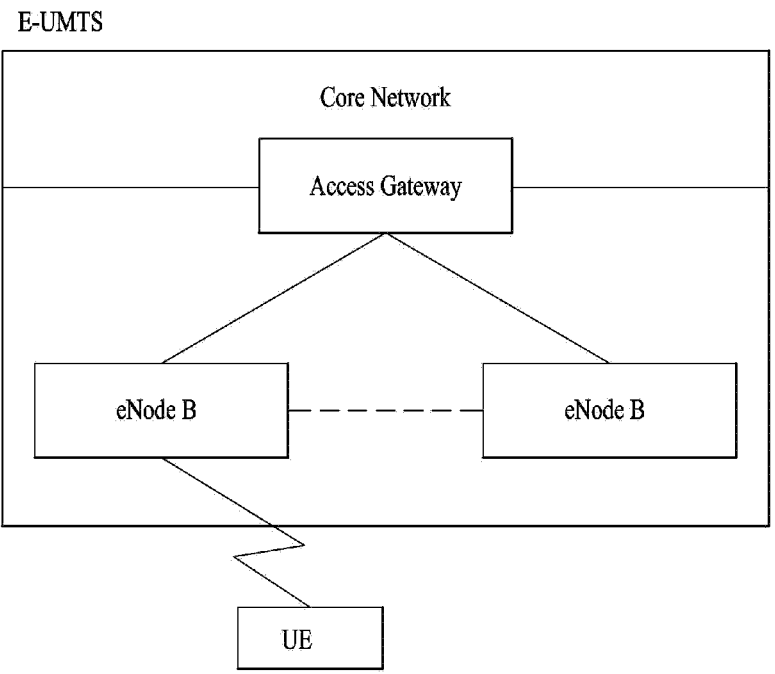
[Fig. 2]
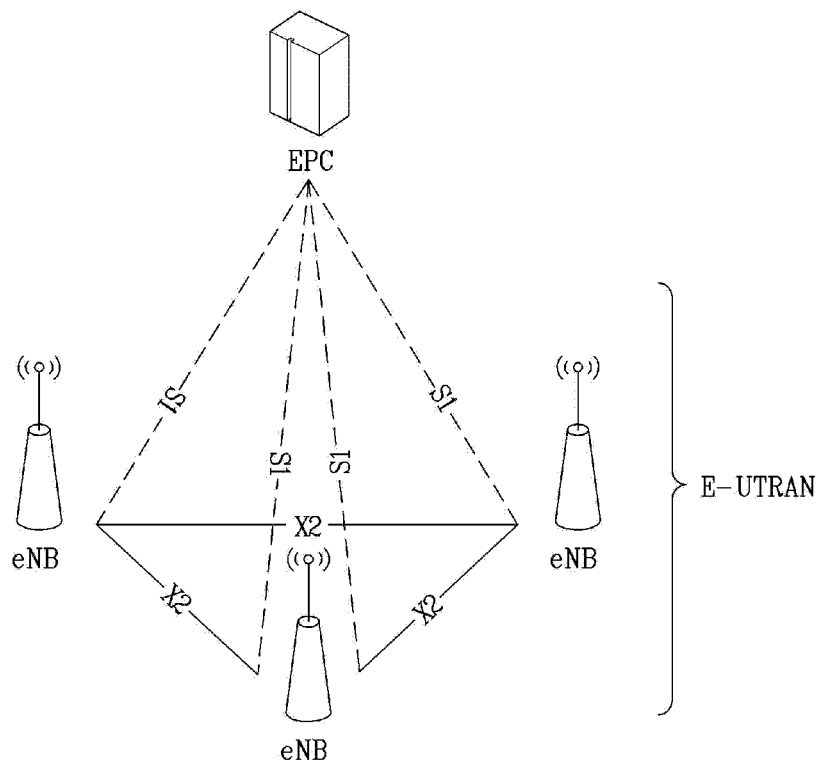

[Fig. 3]
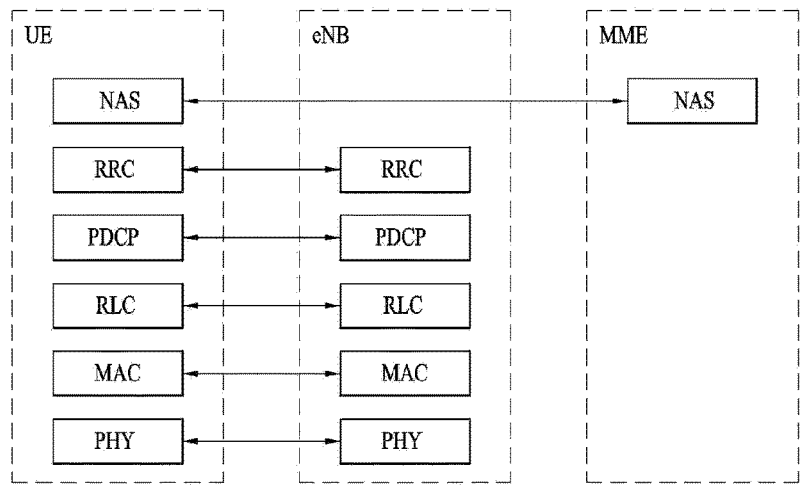
(A) Control-plane protocol stack
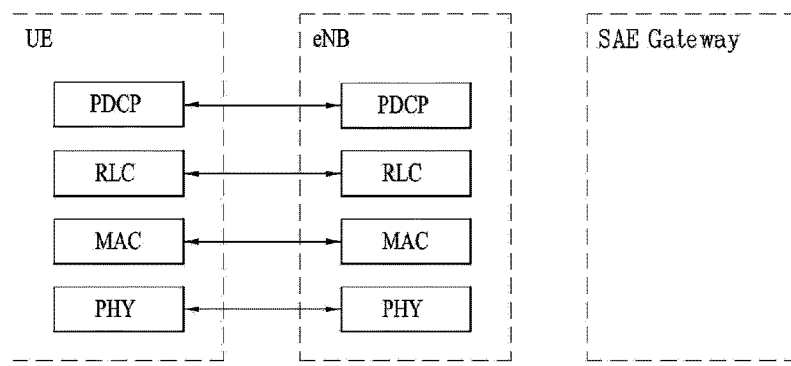
(B) User-plane protocol stack
[Fig. 4]
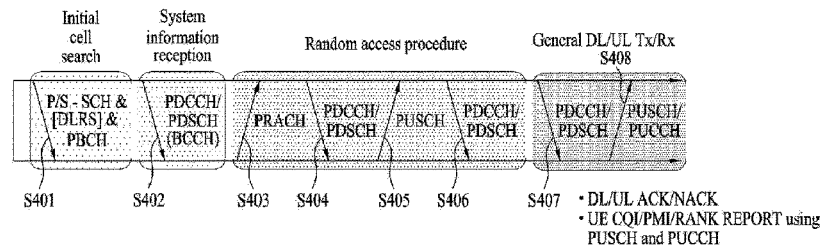
[Fig. 5]
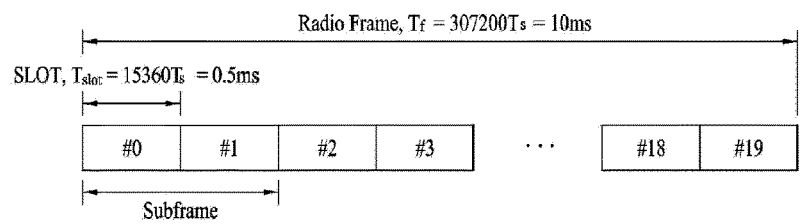

[Fig. 6]
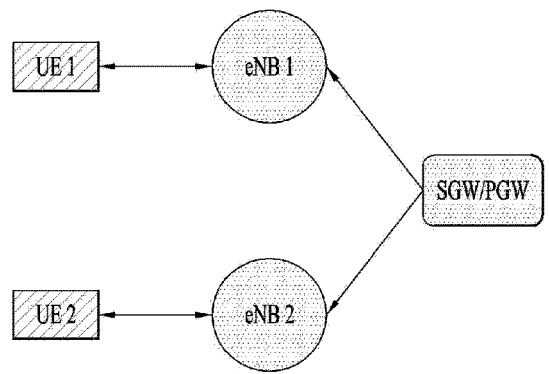
[Fig. 7]
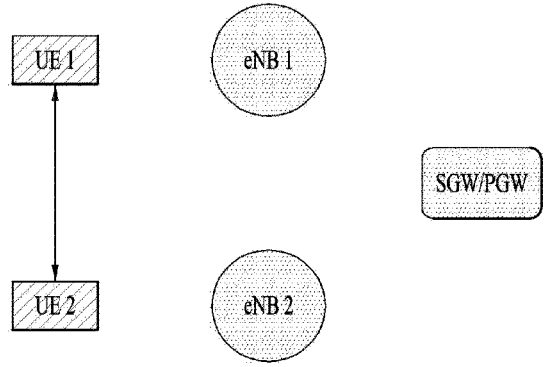
[Fig. 8]
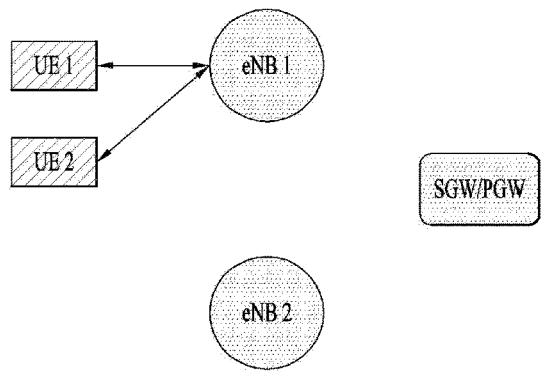
[Fig. 9]
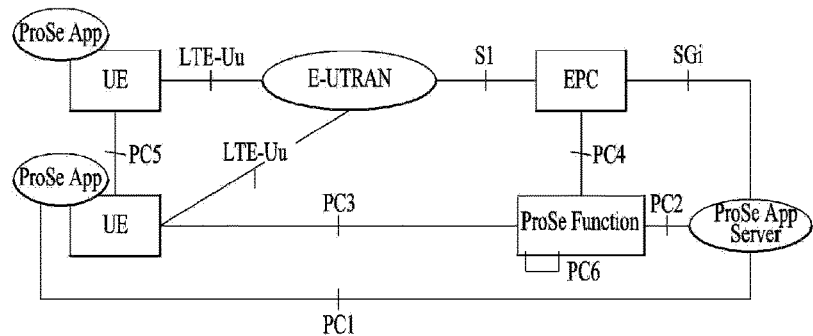

[Fig. 10]
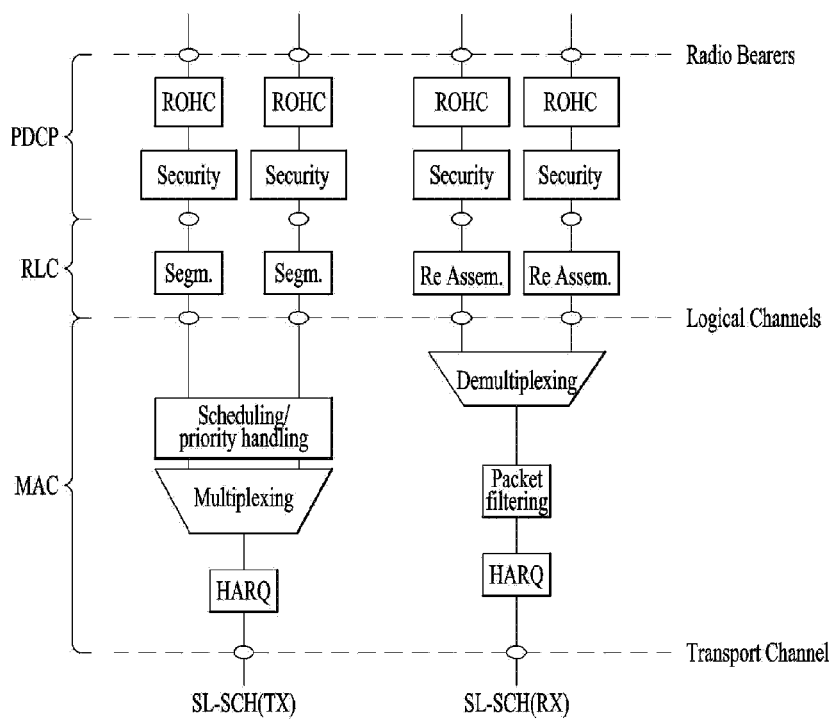

[Fig. 11]
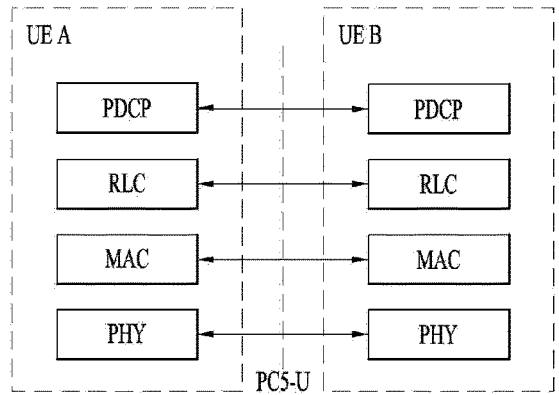
(a)
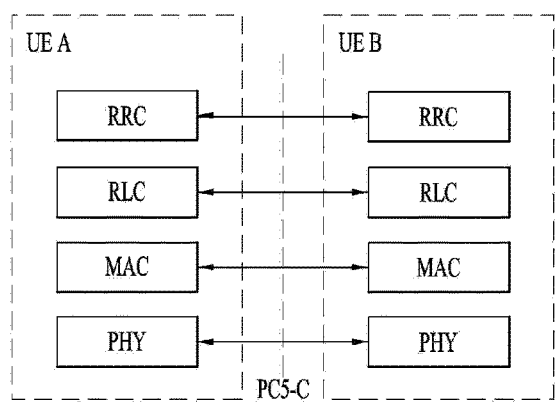
(b)
[Fig. 12]
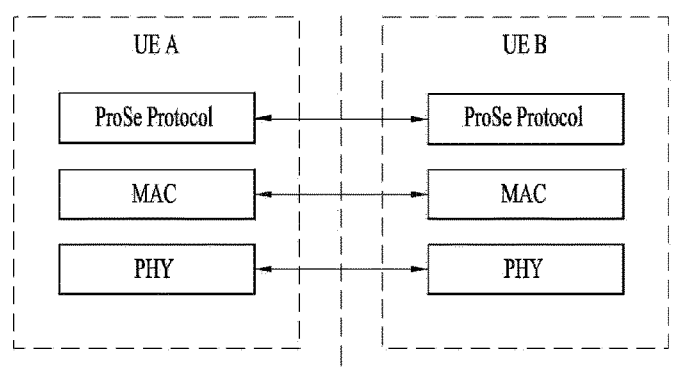

[Fig. 13]
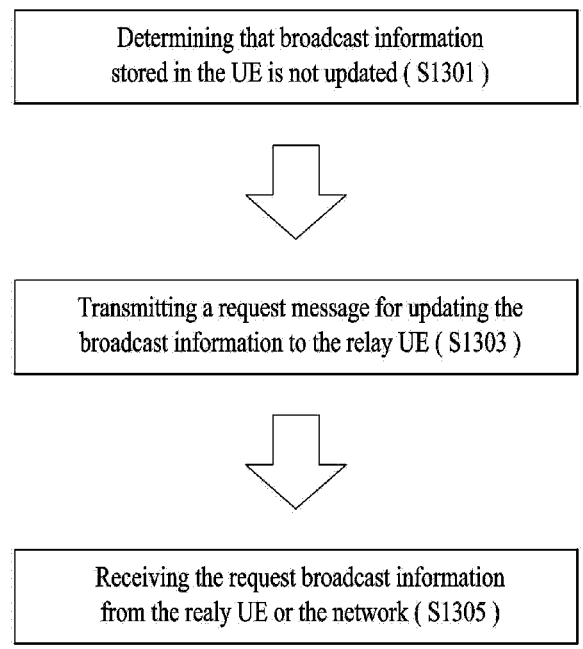
[Fig. 14]
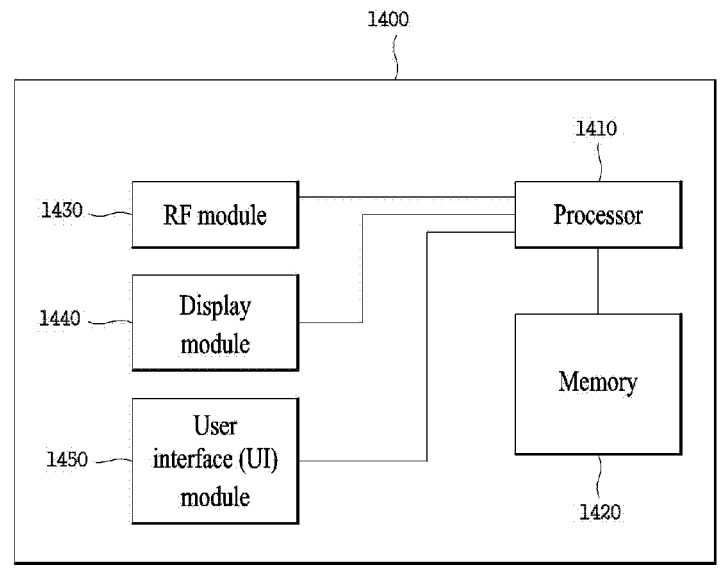

METHOD FOR PROVIDING SYSTEM INFORMATION TO REMOTE UE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2017/002478, filed on Mar. 8, 2017, which claims the benefit of U.S. Provisional Application No. 62/305,492, filed on Mar. 8, 2016, and 62/320,600, filed on Apr. 10, 2016, the contents of which are all hereby incorporated by reference herein in their entirety.

TECHNICAL FIELD

The present invention relates to a wireless communication system and, more particularly, to a method for providing system information to a remote user equipment (UE) in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE OF INVENTION

Technical Problem

Based on the above discussion, the present invention proposes a method for providing system information to a remote user equipment (UE) in a wireless communication system and an apparatus therefor.

Solution to Problem

In accordance with an embodiment of the present invention, a method for receiving broadcast information by a user equipment (UE) connected with a network via a relay UE in a wireless communication system is disclosed. The method includes the steps of determining whether the broadcast information stored in the UE is updated or not; transmitting a request message for updating the broadcast information to the relay UE, when the broadcast information stored in the UE is not updated; and receiving the requested broadcast information from the relay UE or the network.

On the other hand, in accordance with another embodiment of the present invention, user equipment (UE) connected with a network via a relay UE in a wireless communication system is disclosed. The UE comprises a radio frequency (RF) unit; and a processor connected with the RF unit and configured to determine whether the broadcast information stored in the UE is updated or not, transmit a request message for updating the broadcast information to the relay UE when the broadcast information stored in the UE is not updated, and receive the requested broadcast information from the relay UE or the network.

Preferably, the broadcast information comprises a plurality of information blocks, and the request message includes at least one indicator for indicating an information block of the broadcast information to be updated among the plurality of information blocks.

Preferably, timing information to receive the requested broadcast information can be provided from the network. In this case, the requested broadcast information is provided from the network according to the timing information.

More preferably, if a value tag corresponding to the broadcast information is provided from the network, it is determined that the broadcast information stored in the UE is not update when the received value tag is different from a value tag stored in the UE.

Or, if one or more value tags corresponding to one or more information blocks are provided from the network, it is determined that the one or more information blocks stored in the UE is not update when the received value tags are different from value tags corresponding to one or more information blocks stored in the UE.

It is to be understood that both the foregoing general description and the following detailed description of the present invention are exemplary and explanatory and are intended to provide further explanation of the invention as claimed.

Advantageous Effects of Invention

According to embodiments of the present invention, the remote UE can receive and update system information efficiently in the wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 1 is a diagram showing a network structure of an Evolved Universal Mobile Telecommunications System (E-UMTS) as an example of a wireless communication system.

FIG. 2 is a diagram showing the concept of a network structure of an Evolved Universal Terrestrial Radio Access Network (E-UTRAN).

FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.

FIG. 4 is a diagram showing physical channels used in a 3GPP system and a general signal transmission method using the same.

FIG. 5 is a diagram showing the structure of a radio frame used in a Long Term Evolution (LTE) system.

FIG. 6 is an example of default data path for a normal communication;

FIGS. 7 and 8 are examples of data path scenarios for a proximity communication;

FIG. 9 is a conceptual diagram illustrating for a non-roaming reference architecture;

FIG. 10 is a conceptual diagram illustrating for a Layer 2 Structure for Sidelink;

FIG. 11 is a conceptual diagram illustrating for protocol stack for ProSe Direct Communication;

FIG. 12 is a conceptual diagram illustrating for a PC5 interface for ProSe Direct Discovery;

FIG. 13 is a flow chart illustrating an operation in accordance with an embodiment of the present invention;

FIG. 14 is a block diagram of a communication apparatus according to an embodiment of the present invention.

BEST MODE FOR CARRYING OUT THE INVENTION

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

FIG. 5 is a diagram showing the structure of a radio frame used in a Long Term Evolution (LTE) system.

Referring to FIG. 5, the radio frame has a length of 10 ms ($327200 \times T_s$) and includes 10 subframes with the same size. Each subframe has a length of 1 ms and includes two slots. Each slot has a length of 0.5 ms ($15360 \times T_s$). $T_s$ denotes a sampling time, and is represented by $T_s=1/(15 \text{ kHz} \times 2048)= 3.2552 \times 10^{-8}$ (about 33 ns). Each slot includes a plurality of OFDM symbols in a time domain, and includes a plurality of resource blocks (RBs) in a frequency domain. In the LTE system, one RB includes 12 sub-carriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

FIG. 9 is a conceptual diagram illustrating for a non-roaming reference architecture.

PC1 to PC 5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:

Interworking via a reference point towards the 3rd party Applications

Authorization and configuration of the UE for discovery and Direct communication Enable the functionality of the EPC level ProSe discovery ProSe related new subscriber data and/handling of data storage; also handling of ProSe identities;

Security related functionality

Provide Control towards the EPC for policy related functionality

Provide functionality for charging (via or outside of EPC, e.g. offline charging)

Especially, the following identities are used for ProSe Direct Communication:

Source Layer-2 ID identifies a sender of a D2D packet at PC5 interface. The Source Layer-2 ID is used for identification of the receiver RLC UM entity;

Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink subframe.

Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

FIG. 11 is a conceptual diagram illustrating for protocol stack for ProSe Direct Communication.

FIG. 11(a) shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11a.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11(b) shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Recently, wearable devices such as smart watches are now available as a new type of user equipment on the market. As the number of wearable devices is increasing, customers' needs for those devices are growing. For instance, customers expect extremely long battery life from smart watches, like battery life of normal watches, while expecting support of various application/services including delay sensitive services e.g. voice, streaming, eHealth, like normal smart phones.

To provide long battery life, Power Saving Mode is suggested in Release 12 of 3GPP standard and Extended DRX is suggested in Release 13 of 3GPP standard. However, those features are not suited to delay sensitive services in wearable devices which support LTE access.

3GPP SA1 study item New Services and Markets Technology Enablers (SMARTER) has progressed in 2015. One of the aspects in SMARTER is to provide enhanced connectivity to wearable device and IoT devices in the context of connectivity aspects. The enhanced connectivity allows a device to be connected to the network through another UE. The device can switch between a direct connection and a relayed connection to the network.

Wearable devices on the market support Bluetooth and WLAN for a short range communication RAT between UEs. Considering the devices on the market, it is interesting to support the enhanced connectivity via Bluetooth or WLAN. In the meantime, Bluetooth and WLAN cannot fully support various services with different QoS. Thus, it is necessary to provide the enhanced connectivity via 3GPP sidelink.

Reading system information directly from the cell is burden to remote UE, especially considering the coverage enhancement. The remote UE in bad channel condition is required to read more than 100 times of same copies of system information to decode the broadcast information successfully. This cause a severe battery consumption in the remote UE.

In the invention, in order to provide information broadcasted by the cell to the remote UE in an energy efficient way, the network node or relay UE provides the broadcast information to the remote UE upon requested by the remote UE. Especially, it is assumed that the relay UE has up-to-dated information to be broadcasted.

The remote UE requests the broadcast information to the network node or relay UE in following cases:
the remote UE returns from out of coverage, or
the remote UE wakes up from PSM, or
the remote UE wakes up from (e)DRX, or
the remote UE changes a serving cell, or
the validity time for broadcast information has been expired from the moment the broadcast information was successfully confirmed as valid, or
the remote UE receives paging message or PDCCH which indicates the change of system information from network node or relay UE, or
the remote UE receives the system information value tag from network node or relay UE and the value is different from the one stored in the remote UE, or
the remote UE receives the system information value tag defined per SI message/SIB from network node or the relay UE and one or more values are different from the one stored in the remote UE.

Preferably, the request message may include one or more information of 1) the system information value tag (i.e., systemInfoValueTag), 2) the system information value tag defined per SI message/SIB and 3) the necessary system information blocks/SI messages.

Upon receiving the request message, the network node or relay UE provides the broadcast information to the remote UE.

More specifically, when the remote UE only provides a system information value tag and the system information value tag stored in network/relay UE is different from the one received from the remote UE, the network or relay UE provides requested necessary system information block. Especially, if a specific SIB or SI message information is not included in the above request message, all the defined necessary system information for remote UE operation is provided.

Or, when the remote UE only provides a system information value tag and the system information value tag stored in network/relay UE is same as the one received from the remote UE, the network or relay UE provides empty message or provides the indication which indicates that the system information of the remote UE is up-to-date.

Or, when the remote UE only provides a system information value tag defined per SI message/SIB and a system information value tag defined per SI message/SIB which is stored in network/relay UE is different from the one received from the remote UE, the network or relay UE provides the corresponding SI messages/SIBs.

Or, when the remote UE only provides a system information value tag defined per SI message/SIB and a system information value tag defined per SI message/SIB which is stored in network/relay UE is same as the one received from the remote UE, the network or relay UE provides empty message or provides the indication which indicates that the system information of the remote UE is up-to-date.

Or, when the remote UE provides both value tag (i.e., the system information value tag and the system information value tag defined per SI message/SIB) and the system information value tag stored in network/relay UE is same as the one received from the remote UE, the network or relay UE provides empty message or provides the indication which indicates that the system information of the remote UE is up-to-date.

Or, when the remote UE provides both value tag (i.e., the system information value tag and the system information value tag defined per SI message/SIB) and the system information value tag stored in network/relay UE is different from the one received from the remote UE, the network or relay UE provides the only system information of which system information value tag defined per SI message/SIB is different from the one received from remote UE.

Or, when the remote UE provides both value tag (i.e., the system information value tag and the system information value tag defined per SI message/SIB) and the system information value tag stored in network/relay UE is different from the one received from the remote UE by less than the range of system information value tag defined per SI message/SIB, the network or relay UE provides the only system information of which system information value tag defined per SI message/SIB is different from the one received from remote UE.

Or, when the remote UE provides both value tag (i.e., the system information value tag and the system information value tag defined per SI message/SIB) and the system information value tag stored in network/relay UE is different from the one received from the remote UE by equal to or more than the range of system information value tag defined per SI message/SIB, the network or relay UE provides all the necessary system information block is provided. The necessary system information is specified.

Alternatively, the relay UE or network node can be aware of that the broadcast information stored in remote UE is not up-to-date through the way stated above. Therefore, the relay UE or network node can notify the change of broadcast information to remote UE by the following information. Then, the remote UE directly receives the broadcast information via Uu interface (from the serving cell). For example, the relay UE only provides to the remote UE the indication whether the broadcast information has changed or is scheduled to be changed. If the broadcast information is scheduled to be changed, the relay UE additionally provides the time information (e.g., offset time from the current time, SFN) on when the broadcast information actually changes. Or, the relay UE provides the request message to turn on TX/RX chain of the remote UE for the serving cell or exiting from sleep mode (e.g., PSM/(e)DRX).

Preferably, the broadcasted information is system information. Only subset of SIBs may be requested by the remote UE and only the requested SIB is transmitted from network node/relay UE to remote UE. The example of necessary information is MIB, SIB1/2, SIB for cell reselection (e.g. SIB3/4/5/6/7) or System information for (re)selecting relay UE.

Here, System information for (re)selecting relay UE means SIB17/18/19 or a new system information to be used for (re)selecting a relay UE and/or resources for using relay from the remote UE point of view. The example of information used for (re)selecting a relay UE are WLAN identifiers of relay UEs and/or thresholds of RSSI, channel utilization, number of UEs, available backhaul data rate. The threshold may be upper and/or lower threshold.

In the above invention, the network node refers to an eNB.

Further, in case RRC functionality does not support in relay UE for relaying functionality, the request message from remote UE is transferred to eNB via relay UE and the eNB provides the requested broadcast information to the remote UE via relay UE. In case RRC functionality does support in relay UE for relaying functionality, the request message from remote UE is transferred to relay UE and relay UE provides the requested up-to-date broadcast information to the remote UE.

Hereafter, the another way of providing broadcast information to the remote UE is proposed.

In the invention below, it is assumed that the remote UE is in PSM/(e)DRX state for the serving cell and the remote UE is communicating with the relay. Or, the remote UE does not communicate with the serving cell by turning off the TX/RX chain for the serving cell and the remote UE is still communicating with the relay.

The invention comprises of relay UE being aware of change of the broadcast information, notifying the change of broadcast information to the remote UE and the remote UE acquiring the changed broadcast information from the serving cell.

The relay UE knows the change of broadcast information or scheduling of broadcast information using various messages. For example, the relay UE receives paging message or PDCCH which indicates the change (or scheduling) of broadcast information from network node. Or, the relay UE receives the broadcast information value tag from network node and the value is different from the one stored in the relay UE. Or, the relay UE receives the broadcast information value tag defined per SI message/SIB from network node and one or more values are different from the one stored in the remote UE.

After being aware of change of broadcast information, the relay UE acquires all broadcast information or only a changed broadcast information. This step may be skipped.

The relay UE notifies the change of broadcast information to remote UE by the following information. Then, the remote UE directly receives the broadcast information via Uu (from the serving cell) or the relay UE provides the all or subset of broadcast information to the remote UE.

More specifically, the relay UE only provides to the remote UE the indication whether the broadcast information has changed or is scheduled to be changed. If the broadcast information is scheduled to be changed, the relay UE additionally provides the time information (e.g., offset time from the current time, SFN) on when the broadcast information actually changes. Or, the relay UE provides the request message to turn on TX/RX chain of the remote UE for the serving cell or exiting from sleep mode (e.g. PSM/(e)DRX).

For instance, the broadcast information is system information or paging message.

FIG. 13 is a flow chart illustrating an operation in accordance with an embodiment of the present invention.

Referring to FIG. 13, in step 1301, the UE determines whether the broadcast information stored in the UE is updated or not. More specifically, the UE firstly receives a value tag corresponding to the broadcast information broadcasted by the network, and then can determine that the broadcast information stored in the UE is not update when the received value tag is different from a value tag stored in the UE.

Next, in step 1303, when the broadcast information stored in the UE is not updated, the UE transmits a request message for updating the broadcast information to the relay UE.

Preferably, the broadcast information comprises a plurality of information blocks, and the request message includes at least one indicator for indicating an information block of the broadcast information to be updated among the plurality of information blocks.

In this case, the UE can receive one or more value tags corresponding to one or more information blocks broadcasted by the network, and then determine that the one or more information blocks stored in the UE is not update when the received value tags are different from value tags corresponding to one or more information blocks stored in the UE.

Finally, in step 1305, the UE receives the requested broadcast information from the relay UE or the network. Further, the UE may receive timing information to receive the requested broadcast information from the network. In this case, the UE should receive the requested broadcast information from the network according to the timing information FIG. 14 is a block diagram illustrating a communication apparatus in accordance with an embodiment of the present invention.

Referring to FIG. 14, a communication device 1400 includes a processor 1410, a memory 1420, a Radio Frequency (RF) module 1430, a display module 1440, and a user interface module 1450.

The communication device 1400 is illustrated for convenience of the description and some modules may be omitted. Moreover, the communication device 1400 may further include necessary modules. Some modules of the communication device 1400 may be further divided into sub-modules. The processor 1410 is configured to perform operations according to the embodiments of the present invention exemplarily described with reference to the figures. Specifically, for the detailed operations of the processor 1410, reference may be made to the contents described with reference to FIGS. 1 to 13.

The memory 1420 is connected to the processor 1410 and stores operating systems, applications, program code, data, and the like. The RF module 1430 is connected to the processor 1410 and performs a function of converting a baseband signal into a radio signal or converting a radio signal into a baseband signal. For this, the RF module 1430 performs analog conversion, amplification, filtering, and frequency upconversion or inverse processes thereof. The display module 1440 is connected to the processor 1410 and displays various types of information. The display module 1440 may include, but is not limited to, a well-known element such as a Liquid Crystal Display (LCD), a Light Emitting Diode (LED), or an Organic Light Emitting Diode (OLED). The user interface module 1450 is connected to the processor 1410 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for providing system information to a remote user equipment (UE) in a wireless communication system has been described centering on an example applied to the 3GPP LTE system, the present invention is applicable to a variety of wireless communication systems in addition to the 3GPP LTE system.

The invention claimed is:

1. A method for receiving broadcast information blocks by a user equipment (UE) connected with a network via a relay UE in a wireless communication system, the method comprising:
receiving one or more value tags corresponding to one or more broadcast information blocks broadcasted by the network;
determining, by the UE, that the one or more broadcast information blocks stored in the UE is not updated when the received value tags are different from value tags corresponding to one or more broadcast information blocks stored in the UE;

transmitting, by the UE, a request message for updating the broadcast information blocks to the relay UE, when the broadcast information blocks stored in the UE is not updated;

receiving timing information when the requested broadcast information blocks are provided from the network; and receiving, by the UE, the requested broadcast information blocks according to the timing information from the relay UE or the network.

2. The method of claim 1, wherein:

the request message includes at least one indicator for indicating which broadcast information block to be updated among the one or more broadcast information blocks.

3. A user equipment (UE) connected with a network via a relay UE in a wireless communication system, the UE comprising:

a radio frequency (RF) unit including a transceiver; and a processor connected with the RF unit and configured to:

receive one or more value tags corresponding to one or more broadcast information blocks broadcasted by the network, determine that the one or more broadcast information blocks stored in the UE is not updated when the received value tags are different from value tags corresponding to one or more broadcast information blocks stored in the UE, transmit a request message for updating the broadcast information blocks to the relay UE when the broadcast information blocks stored in the UE is not updated, receive timing information when the requested broadcast information blocks are provided from the network, and receive the requested broadcast information blocks according to the timing information from the relay UE or the network.

4. The method of claim 3, wherein:

the request message includes at least one indicator for indicating which broadcast information block to be updated among the one or more broadcast information blocks.

* * * * *